May 18, 1943. A. A. BURRY 2,319,439
PLASTIC MOLDING APPARATUS
Filed Dec. 11, 1939 3 Sheets-Sheet 1

Inventor.
Arthur A. Burry.

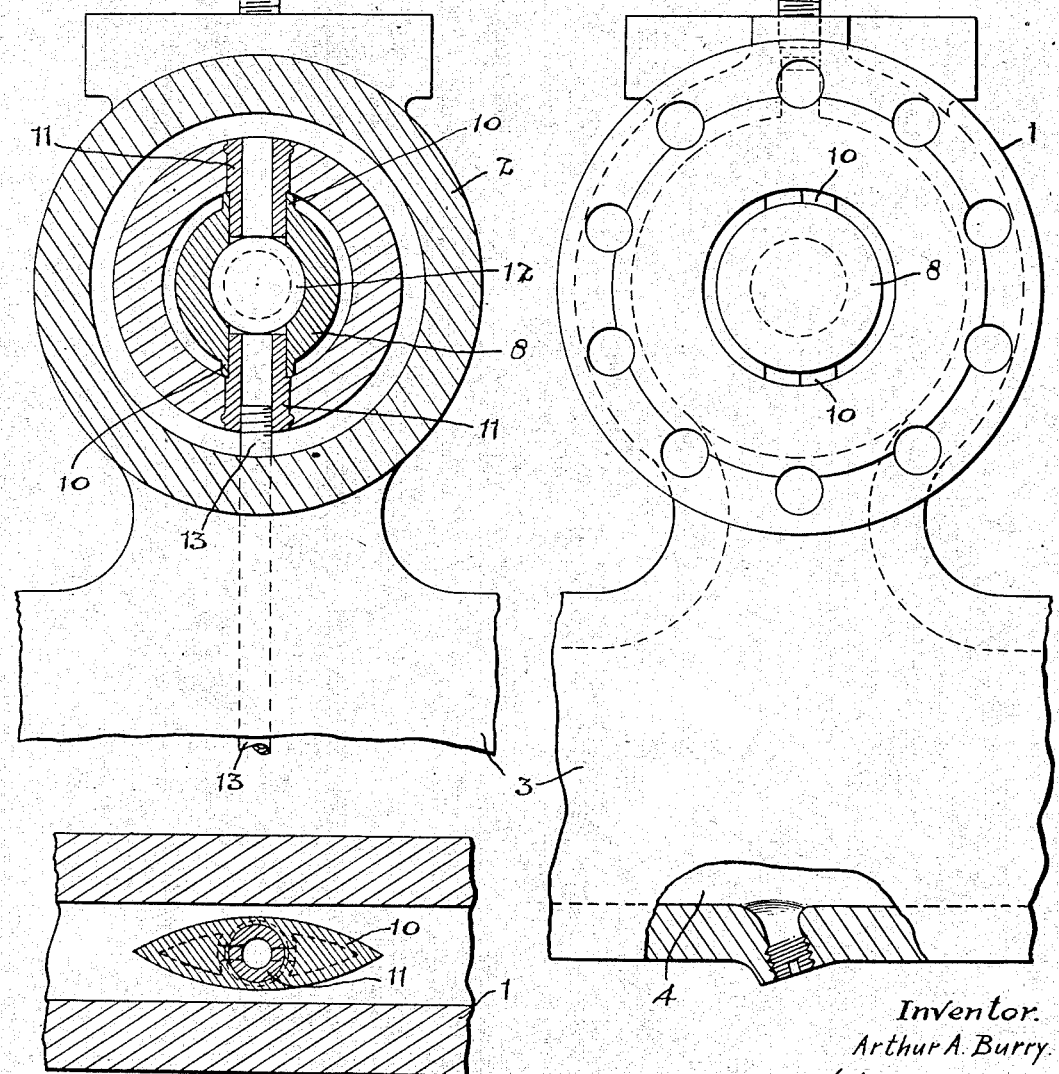

Inventor.
Arthur A. Burry.

Patented May 18, 1943

2,319,439

UNITED STATES PATENT OFFICE 2,319,439

PLASTIC MOLDING APPARATUS

Arthur A. Burry, Toronto, Ontario, Canada

Application December 11, 1939, Serial No. 308,549

5 Claims. (Cl. 18—30)

This invention relates to injection molding in which a plastic in heated form is forced through an injection or extruding orifice and it is an important object of the present invention to ensure a more uniform distribution and accurate control of the plasticizing temperature whereby more dependable and uniform results will be achieved.

The principal feature of the present invention resides broadly in the novel combination with the injection cylinder of a heating jacket surrounding said cylinder having arranged therein means for maintaining a constant temperature about the cylinder in conjunction with a hollow tapered body located within the cylinder and having its interior communicating with the interior of the jacket or with a separately controllable heating unit for circulating a heating medium therethrough.

In the drawings

Figure 3 is a transverse section taken on the line 3—3 of Figure 1.

Figure 4 is a rear end elevational view broken away in part.

Figure 5 is a fragmentary sectional plane taken on the line 5—5 of Figure 1.

Figure 1:
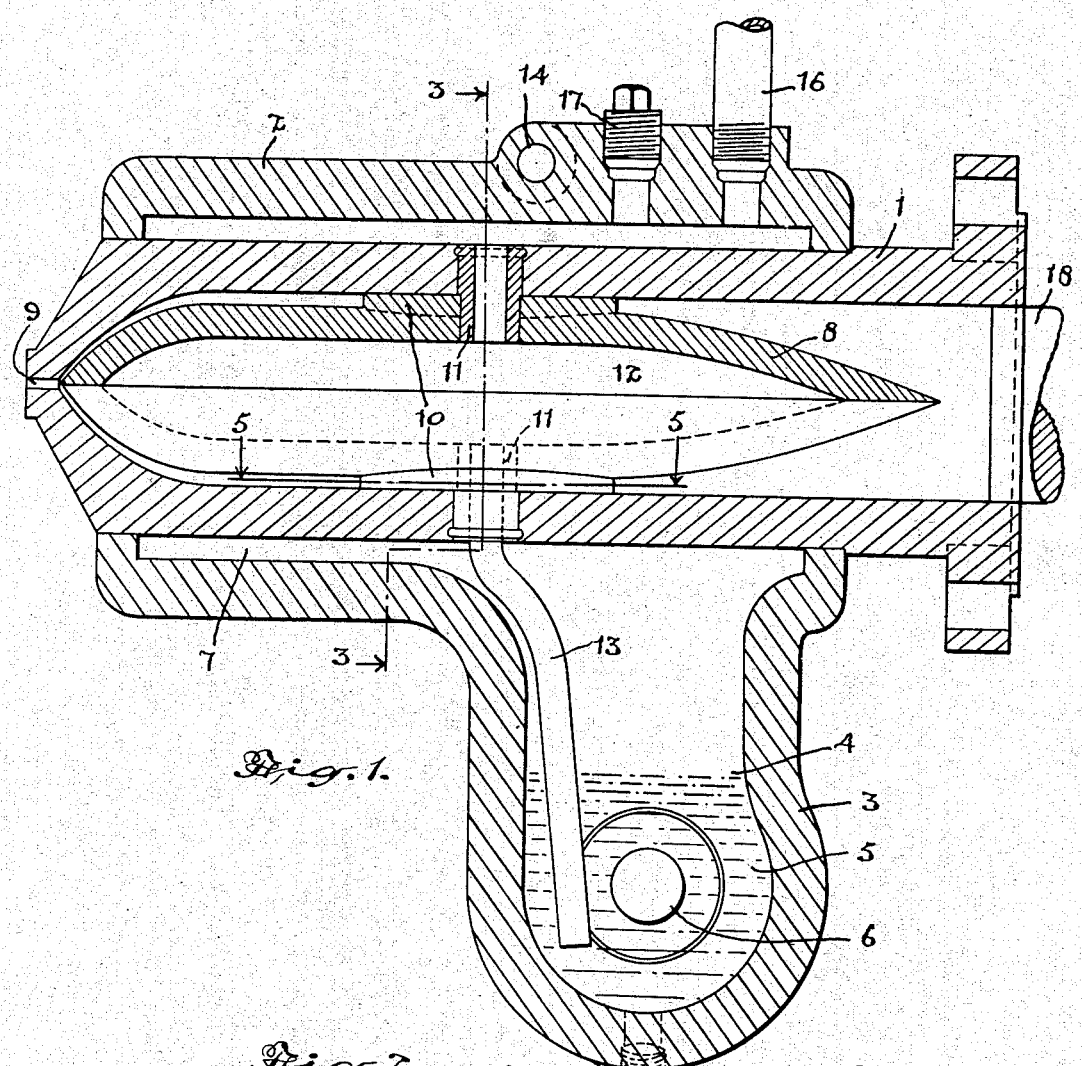
Figure 1 is a mid-sectional elevational view illustrating the present invention in combination with an injection cylinder.
Figure 2:
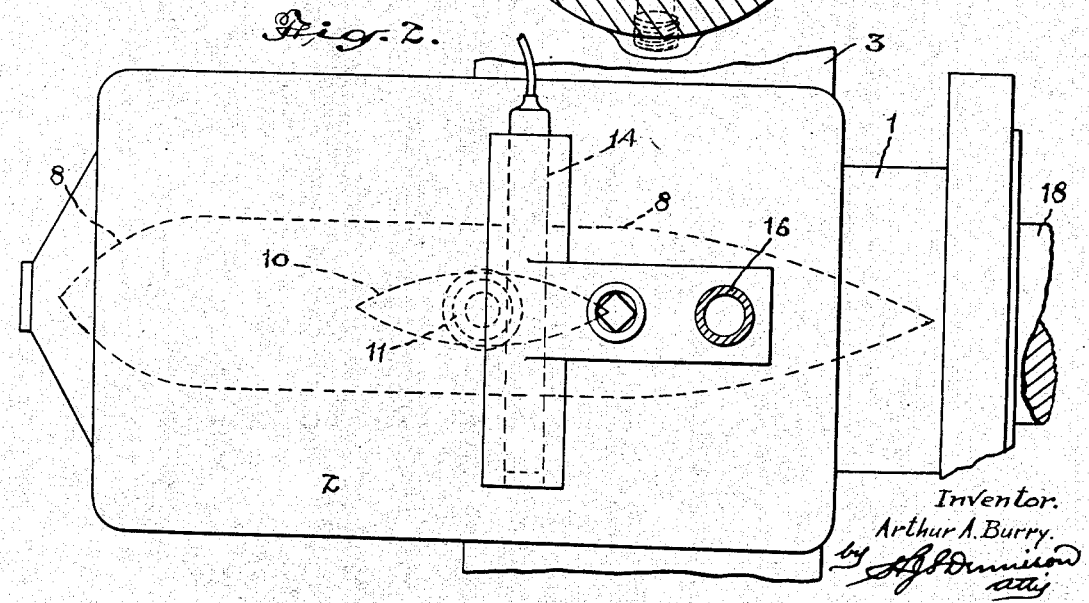
Figure 2 is a plan view.

The injection molding of plastics involves considerable difficulty in maintaining the desired uniform degree of temperature and plasticity throughout the mass in order to ensure the production of a molded product of high quality and uniformity.

In my earlier Patent 2,115,940, dated May 3, 1938, I have disclosed a heating means for plastic injection cylinders wherein an electric heater unit arranged within a jacket encircling the injection cylinder maintains the cylinder in a heated condition by the application of steam thereabout.

This manner of heating the injection cylinder has proven to be extremely efficient and dependable in practice and has alleviated the difficulty previously experienced in maintaining a uniform operating temperature such as when direct heating of the cylinder or associated parts by electrical resistance heaters were attempted.

The present invention proposes a still further improvement in the provision for the circulation of a fluid-heating medium not only about the outer side of the injection or extrusion cylinder but also within a hollow body located within the cylinder and about which the material to be injected or extruded is caused to pass in intimate and extensive surface contact so that the plastic will be subjected to a definitely controlled temperature or temperatures interiorly as well as exteriorly without at the same time involving the possibility of overheating or burning or fouling the die orifice as is possible in the use of directly applied resistance heaters.

In the form of construction illustrated in Figures 1 to 5 an injection cylinder 1 extends through and is jacketed by a casing 2 formed with a downwardly depending hollow extension 3 which forms a sump chamber 4 within which is placed a quantity of water or other suitable vapourizable fluid 5.

A suitable type of electrical immersion heater 6 is arranged in the sump 4 in contact with the body of fluid 5 to vapourize the same, and the vapour is caused to fill the interior of the casing 2, including the space 7 about the cylinder, to effectively heat the cylinder substantially in the manner set forth in my earlier patent above referred to.

Located within the cylinder 1 is a hollow elongated tapered body 8 having its forward tapering end converging into close proximity to the injection or extruding orifice 9. The member 8 is provided with supporting and positioning bosses 10 of elongated tapering form which snugly fit within the cylinder 4, and tubular ducts 11 are inserted through the cylinder wall and extend inwardly through the supporting portions 10 of the member 8 and establish communication between the interior of the jacket casing 2 and the interior 12 of the inner hollow member 8 at the top and bottom of the cylinder.

With this arrangement it will be seen that the steam or vapour within the interior of the casing 2 will be free to enter the upper tubular duct 11 and pass into the interior of the hollow member 8 to effect an extensive heat interchange with the inner wall surface thereof, and condensation formed within the member 8 will pass out through the lower tubular duct 11 and is preferably conducted to the lower level of the sump 4 by a tubular extension 13.

If desired the supporting boss members 10 may be of hollow formation as indicated in dotted lines in Figure 5 in order to further increase the heat exchange surface available to the highly heated steam or vapour within the cylinder proper.

The heating unit 6 will preferably be controlled by a suitable thermostat (not shown) inserted in an orifice 14 in the upper portion of the jacket 2, and a pressure gauge 15 is connected with the interior of the jacket by a tubular conduit 16. A plug 17 is preferably threaded into the casing 2 to enable the charging of the vapourizable liquid 5 thereinto.

In the operation of the device the cylinder 1 will be charged with a suitable quantity of the plastic to be injected through the orifice 9 and by operation of the piston 18 the charge is caused to converge in an annular path about the hollow member 8 and within the cylinder 1, and as it moves toward the ejection orifice 9 it will be thinned out into a thin stratum while absorbing heat on the inward side from the heated member 8 and on the outward side from the heated cylinder 1, so that when it reaches the orifice 9 it will be uniformly heated at exactly the required temperature, thereby ensuring uniform molding results.

Figure 6:
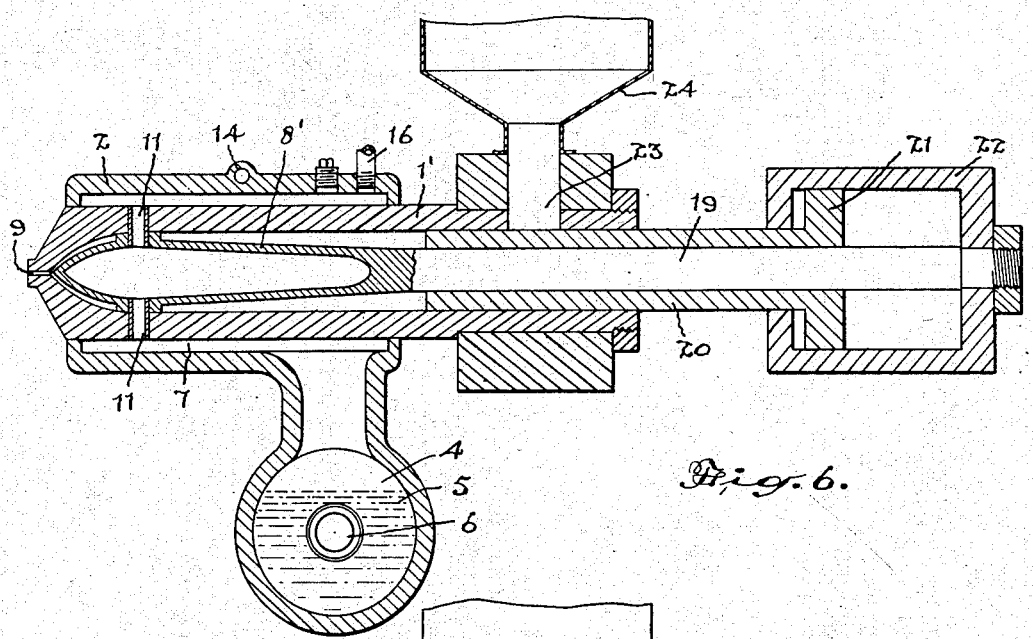
Figure 6 is a longitudinal mid-sectional elevation illustrating a modification of the present invention.

Referring to the modification of Figure 6, the hollow body 8' inserted within the cylinder 1' is shown provided with a rearward cylindrical extension 19 concentrically disposed in the cylinder and encircled by a sleeve-like piston 20 which is adapted to be advanced by a hydraulic piston 21 operating in a cylinder 22.

The tubular piston 20 thus serves to support the rearward end of the hollow member 8', and when the piston 20 is withdrawn at the charging orifice 23 the cylinder 1' will be charged with the material from the supply 24, after which the return movement of the piston 20 will force the charge of material into the vapour-heated zone to be effectively plasticized and subsequently ejected through the orifice 9.

Figure 7:
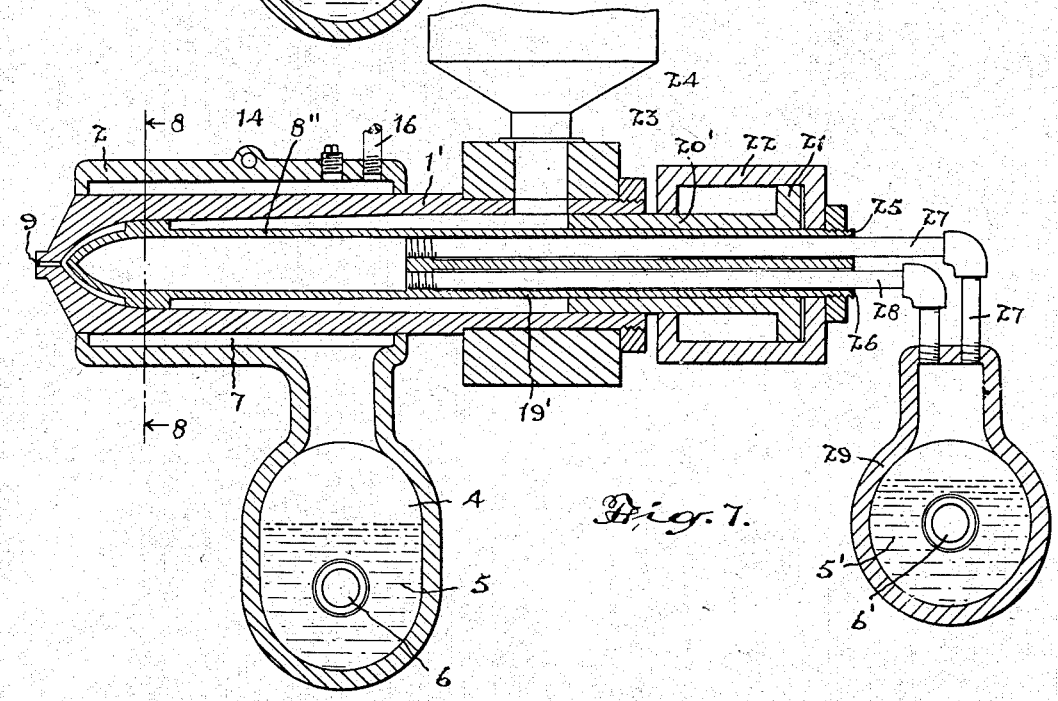
Figure 7 is a longitudinal mid-sectional elevation of a further modified form of the invention.
Figure 8:
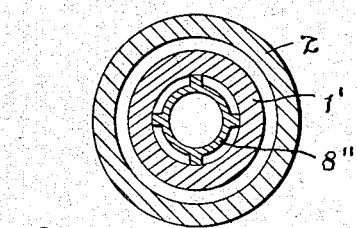
Figure 8 is a transverse section on the line 8—8 of Figure 7.

In the further modification illustrated in Figure 7 I have shown a hollow body 8" concentrically positioned at its forward end within the cylinder 1' by a series of longitudinally tapered ribs intimately fitting the interior surface of the cylinder and supported at its rearward end by the tubular piston 20' which is adapted to operate in the manner of the piston 20 defined in Figure 6.

The rearward extension 19' of the hollow member 8" is here shown provided with passages 25 and 26, one above the other, within which conduits 27 and 28 are inserted.

A separate heating unit 29 is provided comprising a hollow casing containing a body of water or other vapourizable liquid 5', this being vapourized by an electric heating unit 6' which may be suitably controlled so that the temperature of the vapour produced will have a desired predetermined relation to the temperature of the vapour produced within the casing 2 by the heating unit 6.

The conduits 27 and 28 connect with the interior of the heater casing 29 and the heated vapour is adapted to flow mainly through the upper conduit 27 into the interior of the hollow member 8" and condensation will return through the lower conduit 28 back to the unit 29.

The combination defined in connection with Figure 7 will be particularly advantageous in the handling of certain plastics or where it is essential to maintain a temperature difference between the cylinder 1 and hollow member 8", or to compensate for differences in the rate of heat radiation from the cylinder 1' or element 8".

The constructions defined will eliminate difficulties in the extruding or injection molding of plastics, and while I have shown specific structures by way of illustration of the present invention, it will be understood that the invention is capable of further modifications or structural interpretations within the essential spirit thereof.

While the present invention represents a particularly important advance in the art of injection molding of plastics wherein the plastic is forced under high pressure into previously prepared mold cavities, it will nevertheless be advantageously applicable in connection with the extruding of continuous strips of material capable of being softened or plasticized in the manner defined.

What I claim as my invention is:

1. In apparatus of the class described a jacketed cylinder provided with a discharge orifice and means for forcing a plastic from said cylinder through said orifice, means for effecting the circulation of a heating fluid both internally and externally of said cylinder, including a hollow member disposed within the discharge end of said cylinder, and means forming a path of circulation between the interior of said hollow member and the jacket space of the cylinder, to maintain substantially uniform temperatures therein.

2. In an injection molding apparatus for plastics, an injection cylinder, means forming a heating jacket about said cylinder, said jacket containing a quantity of vapourizable fluid, and means for vapourizing said fluid, the combination therewith of a hollow tapered body disposed within said cylinder, and means for supporting said hollow body within said cylinder including tubular ducts extending through the wall of the cylinder and hollow member and forming circulating passages solely between the interior of the jacket and the interior of the hollow member.

3. Apparatus as claimed in claim 2 in which the means for supporting said hollow member within the cylinder includes elongated tapering bosses through which said tubular ducts extend, said bosses being surfaced to conform with the cylinder surface and engaging the inner surface of the cylinder in snug sealing and positioning contact, said tubular ducts comprising short tubular elements sealingly inserted through the bosses and adjacent portions of the jacket wall and terminating entirely within the space enclosed by the outer jacket wall.

4. Apparatus as claimed in claim 2 in which said tubular ducts are arranged one above the other, the upper duct connecting the vapour spaces of the jacket and hollow body, said jacket being provided with a sump for a vaporizable fluid, and a tubular drain duct leading from the lower tubular duct to a point in said sump below the level of the vaporizable fluid therein.

5. In an apparatus of the class described comprising a cylinder having a discharge orifice, pressure means for ejecting a plastic from the cylinder, a sealed jacket spaced from and surrounding said cylinder, a chamber depending from said jacket, adapted to contain a body of water and communicating with the space about said cylinder and an immersion electric heater arranged in said chamber and adapted to be surrounded by said body of water and to generate steam, the combination therewith of means for circulating within the cylinder a portion of the steam generated to maintain substantially uniform temperature conditions interiorly and exteriorly of said cylinder and ensure uniform plasticizing of the contents being ejected therefrom.

ARTHUR A. BURRY.